United States Patent [19]
Takahashi

[11] Patent Number: 5,958,659
[45] Date of Patent: Sep. 28, 1999

[54] POLYESTER-BASED PHOTOGRAPHIC SUPPORT AND PROCESS FOR PRODUCING THE SAME

[75] Inventor: Jun Takahashi, Shiga-ken, Japan

[73] Assignee: Mitsubishi Polyester Film Corporation, Tokyo, Japan

[21] Appl. No.: 08/990,523

[22] Filed: Dec. 15, 1997

[30] Foreign Application Priority Data

| Dec. 17, 1996 | [JP] | Japan | 8-337003 |
| Apr. 23, 1997 | [JP] | Japan | 9-120167 |
| May 26, 1997 | [JP] | Japan | 9-151616 |
| May 26, 1997 | [JP] | Japan | 9-151617 |
| May 26, 1997 | [JP] | Japan | 9-151618 |
| May 28, 1997 | [JP] | Japan | 9-154585 |

[51] Int. Cl.$^6$ .............. G03C 1/93; G03C 1/795; B32B 27/38
[52] U.S. Cl. .......... 430/533; 428/413; 428/414; 427/209; 427/340
[58] Field of Search .................. 430/533; 428/413, 428/414; 427/209, 340

[56] References Cited

U.S. PATENT DOCUMENTS

| 4,252,885 | 2/1981 | McGrail et al. | 430/533 |
| 4,585,687 | 4/1986 | Posey et al. | 430/533 |
| 4,863,801 | 9/1989 | Vallarino | 428/414 |
| 5,270,283 | 12/1993 | Koshizuka et al. | 428/413 |
| 5,691,400 | 11/1997 | Carey et al. | 428/413 |

FOREIGN PATENT DOCUMENTS

| 0 683 060 | 11/1995 | European Pat. Off. . |
| 63-249842 | 10/1988 | Japan . |

*Primary Examiner*—Richard L. Schilling
*Attorney, Agent, or Firm*—Foley & Lardner

[57] ABSTRACT

The present invention relates to a polyester-based photographic support comprising:

a polyester film, and a coating layer formed thereon by applying a coating solution containing an aqueous polyester and an aqueous epoxy group-containing compound so as to be a dry weight ratio of 30/70 to 90/10, on at least one side of said polyester film.

17 Claims, No Drawings

POLYESTER-BASED PHOTOGRAPHIC SUPPORT AND PROCESS FOR PRODUCING THE SAME

BACKGROUND OF THE INVENTION

The present invention relates to a polyester-based photographic support and a production process thereof. More particularly, the present invention relates to a photographic support comprising a polyester film and an undercoat having high adhesion to the photosensitive layer provided on the support, and a production process thereof.

Polyester films represented by polyethylene terephthalate film and polyethylene-2,6-naphthalate film, are suitable for use as a photographic support because of their excellent chemical and physical properties such as mechanical strength, dimensional stability, transparency and flatness, and have practically been used popularly for this purpose. Polyester films, however, also have a disadvantage of poor surface activity, especially low adhesion to the photosensitive layer formed on the support by topcoating it with a photographic emulsion using a gelatin-based binder.

Secure adhesion of the photosensitive layer to the support is essential not only when the finished photographic material is dry but also when it is still in a wet state during photographic treatments such as development.

Therefore, in case where a polyester film is used as a photographic support, there is usually formed on the film a layer of a certain type of polymer, which can serve as an easily adhesive layer, before providing the photosensitive layer.

Specifically, it is known to provide a layer of a polyester copolymer, a vinylidene chloride copolymer, a mixture of gelatin and a hydrophilic vinyl or acrylic copolymer, a carboxy-modified polyethylene or the like as the above-mentioned easily adhesive layer. Also, in some cases, the polyester film is subjected to a pretreatment such as corona discharge treatment before providing the polymer layer.

However, the above-mentioned methods have the following problems. (A) A thicker easily adhesive layer is required so as to achieve adhesive properties for practical use. Namely, an improvement of adhesive properties is insufficient. (B) When cut scrap polyester film having easily adhesive layer is recycled, the obtained film is undesirably colored. For example, when cut scrap polyester film having polyvinylidene chloride coat is recycled, melted and processed to form a film, there are problems that chlorine gas is generated, the apparatus for film production is corroded by chlorine and the produced film is undesirably colored. These problems become serious when the thicker easily adhesive layer is used so as to overcome the above problem (A). (C) The improvement of adhesive properties by conducting corona discharge-treatment is more insufficient than that by providing easily adhesive layer.

Therefore, there is a strong demand to provide a polyester film having an easily adhesive layer which causes no problems descried in the above.

As a result of the present inventor's earnest studies to solve the above problems, it has been found that a polyester film obtained by applying a coating solution containing an aqueous polyester and an aqueous epoxy group-containing compound in a specific ratio on at least one side of the polyester film and drying the coat, shows high adhesiveness to the photosensitive layer and is suited for use as a polyester-based photographic support.

The present invention has been attained on the basis of the above finding.

SUMMARY OF THE INVENTION

An object of the present invention is to provide a polyester-based photographic support having high adhesiveness to a photosensitive layer whether it is dry or in a wet state.

An another object of the present invention is to provide a process for producing a polyester-based photographic support having high adhesiveness to a photosensitive layer whether it is dry or in a wet state.

An other object of the present invention is to provide a photographic material comprising of a polyester-based photographic support having high adhesiveness to a photosensitive layer whether it is dry or in a wet state, and a photosensitive layer.

To accomplish the aim, in a first aspect of the present invention, there is provided a polyester-based photographic support comprising:

a polyester film, and a coating layer formed thereon by applying a coating solution containing an aqueous polyester and an aqueous epoxy group-containing compound so as to be a dry weight ratio of 30/70 to 90/10, on at least one side of the said polyester film.

In a second aspect of the present invention, there is provided a process for producing a polyester-based photographic support, which comprises applying a coating solution containing an aqueous polyester and an aqueous epoxy group-containing compound in a dry weight ratio of 30/70 to 90/10, on at least one side of a polyester film, and drying the coat.

In a third aspect of the present invention, there is provided a photographic material comprising a polyester-based photographic support defined in the first aspect and at least one photosensitive layer provided on the said support.

DETAILED DESCRIPTION OF THE INVENTION

The present invention is described in detail below.

The "polyester" in the polyester film mentioned in the present invention refers to a polymer having an ester group obtained from polycondensation of a dicarboxylic acid and a diol or a hydroxy-carboxylic acid.

The dicarboxylic acids usable for the polycondensation include, for example, terephthalic acid, isophthalic acid, adipic acid, azelaic acid, sebacic acid, 2,6-naphthalenedicarboxylic acid and 1,4-cyclohexanedicarboxylic acid. Examples of the diols include ethylene glycol, 1,4-butanediol, diethylene glycol, triethylene glycol, neopentyl glycol, 1,4-cyclohexanedimethanol and polyethylene glycol. Examples of the hydroxy-carboxylic acids include p-hydroxybenzoic acid and 6-hydroxy-2-naphthoic acid.

Typical examples of the said polyester are polyethylene terephthalate (hereinafter abbreviated as PET), polyethylene-2,6-naphthalate (hereinafter abbreviated as PEN) and 1,4-cyclohexane terephthalate.

The polyester used in the present invention may be a homopolymer or a copolymer obtained by copolymerizing three or more monomers. Actually, however, a homopolymer of PET or PEN is preferably selected in view of the required photographic properties such as mechanical strength, thermal stability and dimensional stability as well as producibility and production cost.

The intrinsic viscosity of the polyester used in the present invention is usually not less than 0.45, preferably 0.50 to 1.0, more preferably 0.52 to 0.90. Use of a polyester having an intrinsic viscosity less than 0.45 may result in a reduced producibility in the manufacture of films or a reduced mechanical strength of the produced film. On the other hand, in view of melt extrusion stability of the polymer, it is preferable that the intrinsic viscosity of the polymer used does not exceed 1.0.

Usually, inorganic or organic particles are contained in the polyester film to roughen the film surface to an appropriate degree, thereby improving slip properties and workability of the film in its production process or take-up step. As such particles, there can be used, for example, the particles of calcium carbonate, calcium phosphtate, silica, kaolin, talc, titanium dioxide, alumina, barium sulfate, calcium fluoride, lithium fluoride, zeolite, molybdenum sulfide, crosslinked organic polymers, calcium oxalate and the like. The particles precipitated in the course of polyester polymerization are also usable.

The size and the amount of these particles to be added are properly selected depending on the type of the photograph used. For certain uses, substantially no particles may be contained. In applications where a highly transparent support is required, the less the particles contained, the better. Also, the smaller the particle content, the more preferable for providing the pertinent sliding property.

The average size of these particles is usually 0.005 to 5.0 $\mu$m, preferably 0.01 to 3.0 $\mu$m. When the average particle size exceeds 5.0 $\mu$m, the produced film surface tends to be roughened to an excessive degree. Also, the particles become liable to fall off the film during use. When the average particle size is less than 0.005 $\mu$m, formation of the surface projections by the particles tends to become insufficient for producing the desired effect of improving the slip properties of the film. In this case, it is necessary to add a large amount of particles and consequently, the mechanical properties of the produced film is impaired.

The particle content in the film is usually 0 to 30% by weight, preferably 0.01 to 20% by weight based on the weight of polyester. An excess amount of particles may deteriorate the mechanical properties of the film.

It is possible to blend two or more different types of particles or the particles of the same type but different in particle size. In either case, it is preferable that the average particle size and the total content of the particles in the film fall within the above-specified ranges.

In the production of the polyester containing the said particles, the particles may be added in the course of the synthesis of polyester or may be added directly to the polyester. In the former case, the particles are preferably added in the form of a slurry formed by dispersing the particles in a pertinent substance such as ethylene glycol, at any suitable stage in the synthesis of polyester. In the later case of direct addition, the particles are preferably added and mixed in the polyester as dry particles or in the form of a slurry formed by dispersing the particles in water or an organic solvent having a boiling point not higher than 200° C., by using a twin-screw kneader-extruder. The particles to be added may be subjected to pretreatments such as comminution, dispersion, classification, filtration, etc.

For adjustment of the particle content, it is preferable to employ a method in which a master material containing the particles in a high concentration is prepared by the above-described method, and when a film is made therefrom, it is diluted with a material containing substantially no particles to adjust the particle content in the film.

Besides the said particles used as a projection-forming agent, it is also possible to contain as desired other additives such as antistatic agent, stabilizer, lubricant, crosslinking agent, anti-block agent, antioxidant, coloring matter (dye and pigment), light screen, ultraviolet absorber, etc., as required, provided that these additives do not affect the performance of the film as a photographic support in the intended use.

The polyester film of the present invention may have a multilayer structure as far as the finally provided properties of the film satisfy the requirements for a photographic support. For example, it may be a laminated co-extrusion film. In this case, the above definition regarding the base film applies to the polyester of the outermost surface layer.

The polyester film of the present invention is preferably biaxially stretched in view of the property requirements for a photographic support.

The known methods can be employed for the production of the polyester film itself, but biaxial stretching of the film is conducted by either simultaneous or successive stretching, preferably successive stretching.

A more detail production process of the polyester film according to the present invention is described below.

The starting polyester material is supplied to an extruder and melt extruded from a slit die at a temperature above the melting point of the polyester. The molten sheet-like extrudate is rapidly chilled to a temperature below the glass transition point and solidified on a rotating chilling drum to form a substantially amorphous non-stretched film. In this operation, it is preferable to enhance adhesion between the sheet and the rotating chilling drum surface for improving planarity of the sheet. In the present invention, a electrostatic pinning method and/or a liquid coating adhesion method are preferably employed for the above purpose.

The electrostatic pinning method is a technique in which usually a linear electrode is set on the top surface side of the sheet in the direction orthogonal to the sheet flow, and a DC voltage of 5 to 10 kV is applied to the electrode to give static charges to the sheet, thereby enhancing adhesion of the sheet to the drum surface. The liquid coating adhesion method is a technique in which a liquid is coated uniformly on the whole or a part (for example, the portions contacting both ends of the sheet) of the rotating cooling drum surface, thereby enhancing adhesion between the sheet and the drum surface. In the present invention, both of these methods may be conducted simultaneously.

The thus obtained non-stretched sheet is stretched usually in the two axial directions either simultaneously or successively. Here, the case of successive biaxial (longitudinal and transverse) stretching is described. Generally, the non-stretched sheet is stretched in the longitudinal (machine) direction of the sheet by a group of rolls having a peripheral speed difference. First, the sheet is preheated to a temperature between the glass transition point and the melting point of the sheet and maintained at this temperature. This temperature is preferably 70 to 150° C. in the case of PET and 115 to 170° C. in the case of PEN. Then the sheet is stretched 2 to 10 times in total by making use of the peripheral speed difference between the rolls. This stretching my be conducted either in a single stage or in two or more stages. Then the sheet is stretched in the transverse direction, namely in the direction orthogonal to the previous longitudinal stretching direction. More specifically, the monoaxially oriented film, either after once cooled to a temperature below the glass transition point or without being cooled, is stretched 2 to 10 times at a temperature between the glass transition point and the melting point of the sheet, preferably at 80 to 150° C. in the case of PET and 120 to 180° C. in the case of PEN, while the film ends are usually held by clips.

In the example shown here, stretching is first conducted in the longitudinal (machine) direction and then transverse stretching is conducted. But the order of stretching may be reversed, that is, transverse stretching may precede longitudinal stretching. Also, stretching may be conducted in portions, and further, the respective portions of stretching may be partly performed alternately. The example of this system is a re-stretching method to obtain a high-strength film.

The thus obtained biaxially oriented film is usually subjected to a heat-treatment for elongation within 30%, defined shrinkage or fixation of length. Usually the heat treatment time is preferably one second to 5 minutes. During or after this heat-treatment, there may be conducted a relaxing-treatment for giving usually less than 10%, preferably less than 5% relaxation, so that the heat shrinkage in the longitudinal direction falls within the preferred range. The heat-treatment temperature, although variable depending on the stretching conditions, is preferably between the glass transition point and the melting point of the polyester used, that is, 170 to 250° C. for PET and 170 to 270° C. for PEN.

If the heat-treatment time is longer or the treating temperature is higher than described above, polyester crystallization tends to advance excessively, and when a coating layer is formed by in-line coating described later, the resin forming the coating layer may be thermally decomposed. In case where the heat-treatment is insufficient, film shrinkage may enlarge.

In any case, it is essential to select the conditions which can provide a finished film having the properties required for a photographic support.

The thickness of the photographic support obtained in accordance with the present invention may be properly selected according to the purpose of use of the photograph, but the thickness is preferably 50 to 350 µm. When the thickness is less than 50 µm, the support tends to lack rigidity, and when the thickness is more than 350 µm, the photographic material produced by using the said support tends to deteriorate in handling qualities because of the increased weight and is also disadvantageous in terms of cost.

The coating layer provided on the polyester film according to the present invention is here explained.

The coating layer is formed by applying a coating solution on the polyester film and drying the coat. Coating may be conducted after formation of the said polyester film or in the polyester film forming process. The latter method is called in-line coating. In in-line coating, it is preferable that the coating solution meets several specific requirements. In the present invention, the coating layer is preferably formed by in-line coating. The coating solution used for in-line coating is required to have no risk of causing cracking of the formed coating layer when stretched, and consequent clouding of the produced film; to have good coating properties; to be able to form a film which can exhibit its full capacity even if the film is small in thickness; and to be of an aqueous system.

"In-line coating" referred to herein is a method in which coating is conducted at any optional stage in the process from melt extrusion of the polyester to heat-fixing after biaxial stretching, but usually the coating solution is applied to a non-stretched sheet of a substantially amorphous state formed by melt extrusion and ensuing rapid chilling, or a monoaxially stretched film obtained by stretching the said sheet in the longitudinal (machine) direction (before stretched in the transverse direction), or a biaxially stretched film before heat-fixing. Especially preferably, the coating solution is applied to a polyester film stretched in the machine direction, and the coated film is further stretched in the transverse direction after drying or in an undried state. This is for the reasons that manufacture of the film and its coating and drying can be accomplished at the same time, offering an advantage in production cost, that thin film coating is possible since stretching is conducted after coating, and that the heat-treatment performed after coating is at such a high temperature as impracticable with the other methods, and consequently strong adhesion is provided between the polyester film and the coat.

The coating solution used for in-line coating is preferably of an aqueous system from the standpoint of safety and working environment. The coating solution used in the present invention is an aqueous solution containing an aqueous polyester and an aqueous epoxy group-containing compound.

However, a small quantity of an organic solvent may be added, if necessary, for improving stability, dispersibility and other coating properties of the coating solution. In the aqueous polyesters and aqueous epoxy group-containing compounds which are discussed later, the same manner may be used. Also, an organic solvent contained in the starting material may be mixed in the prepared coating solution.

As the above-mentioned organic solvent, a relatively hydrophilic solvent is preferably used. Examples of such organic solvents are aliphatic or alicyclic alcohols, glycols, esters, ethers, amide compounds and the like. Specifically, the alcohols include methanol, ethanol, isopropanol, n-butanol, and the like; the glycols include ethylene glycol, propylene glycol, diethylene glycol, and the like; the esters include ethyl acetate, amyl acetate, and the like; the ethers include methyl cellosolve, ethyl cellosolve, tetrahydrofuran, and the like; and the ketones include acetone, methylethyl ketone, and the like. Other organic solvents usable for the said purpose include acetonitrile, N-methylpyrrolidone, N,N-dimethylformamide and the like. These organic solvents may be used either singly or as a mixture of two or more of them as required.

In case where water alone is used as main medium for the coating solution and coating composition, although the composition may be the one prepared by forcibly dispersing the component compounds with a surfactant or the like, it is preferable to use a self-dispersing type composition for obtaining a good dispersing stability of the coating solution. "Self-dispersing type coating composition" is a composition obtainable by introducing various types of hydrophilic group to the component compounds by means of chemical bond. The hydrophilic components usable here include the non-ionic type such as hydroxyl groups and polyethers, the anionic type such as sulfonic acid, carboxylic acid, phosphoric acid and their salts, and cationic type such as onium salts, e.g. quaternary ammonium salt. These chemical species may be introduced by means of copolymerization or grafting to obtain a self-dispersing type coating composition.

Coating of the polyester film can be conducted by using a known coating means, for example, reverse roll coater, gravure coater, rod coater, air doctor coater, etc., such as illustrated in Y. Harasaki: Coating System, Maki Shoten, 1979.

The thickness (after dried) of the final coating layer is usually 0.001 to 10 µm, preferably 0.010 to 5 µm, more preferably 0.015 to 2 µm. When the coating layer thickness is less than 0.001 µm, the coating layer may fail to show the anticipated adhesiveness to the photosensitive layer. On the other hand, when the coating layer thickness is more than 10 μm, the coating layer may behave like an adhesive to cause sticking, so-called blocking, of the contacting parts of the rolled up film. Unnecessary increase of the coating layer thickness is also undesirable in terms of manufacturing cost and producibility.

The "aqueous polyester" referred to in the present invention means a water-soluble or water-dispersible polyester resin-made coating composition using water as main coating medium.

As the components of such polyester resins, there can be used, for example, polyvalent carboxylic acids and polyvalent hydroxyl compounds such as mentioned below. Polyvalent carboxylic acids usable as such resin component include terephthalic acid, isophthalic acid, orthophthalic acid, phthalic acid, 4,4'-diphenyldicarboxylic acid, 2,5-naphthalenedicarboxylic acid, 2,6-naphthalenedicarboxylic acid, 1,4-cyclohexanedicarboxylic acid, 2-potassiumsulfoterephthalic acid, 5-sodiumsulfoisophthalic acid, adipic acid, azelaic acid, sebacic acid, dodecanedicarboxylic acid, glutaric acid, succinic acid, trimellitic acid, trimesic acid, trimellitic acid anhydride, phthalic anhydride, p-hydroxybenzoic acid, trimellitic acid monopotassium salt, pyromellitic acid, and their ester-forming derivatives. Polyvalent hydroxy compounds include ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexane dimethanol, p-xylylene glycol, bisphenol A-ethylene glycol adduct, diethylene glycol, triethylene glycol, polyethylene glycol, polypropylene glycol, polytetramethylene glycol, polytetramethylene oxide glycol, dimethylolpropionic acid, glycerin, trimethylolpropane, sodium dimethylolethylsulfonate, and potassium dimethylolpropionate.

From these compounds, one or more are properly selected and subjected to a conventional polycondensation reaction to synthesize a polyester resin. Preferred examples of polyvalent carboxylic acids usable in the present invention are terephthalic acid, isophthalic acid, 2,6-naphthalenedicarboxylic acid, 1,4-cyclohexanedicarboxylic acid and their ester-forming derivatives. Preferred examples of polyvalent hydroxy compounds are ethylene glycol, diethylene glycol, triethylene glycol, neopentyl glycol and 1,4-cyclohexanedimethanol. An etherification reaction between the hydroxy compounds may take place during the polyester polycondensation reaction.

As mentioned above, in the present invention, the self-dispersing type polyester resin is preferred to the polymer resin which is forcibly dispersed with the aid of a surfactant or other agent. It is, therefore, preferable to introduce a hydrophilic functional group or a hydrophilic compound such as mentioned below into the resin. As the introduction method, a commonly practiced method is usable. Examples of such hydrophilic functional groups include the acid groups or base groups which are ionized in water, their salt groups, and a hydroxyl group. The hydrophilic compounds include ethers, especially polyethers, esters and amides.

In the present invention, it is preferred to introduce an anionic group such as an acid group or its salt group in view of dispersibility of the coating composition, its stability, adhesiveness of the coating layer and other performance. This is also advantageous in terms of polymerizability of the polyester.

A polyester resin having such an anionic group can be obtained by combining a compound having an anionic group with a polyester by means of copolymerization or grafting. The anionic group is properly selected from sulfonic groups, carboxylic acid groups, phosphoric acid groups and their lithium salt groups, sodium salt groups, potassium salt groups, ammonium salt groups and the like. Especially preferably, a monomer having an anionic group such as mentioned above or capable of producing an anionic group after polymerization is copolymerized in a polyester resin.

Examples of such monomers include the polyester-composing compounds mentioned above, preferably 5-sulfoisophthalic acid, its salts, trimellitic acid, pyromellitic acid, anhydrides thereof and ester forming derivatives of these polyvalent carboxylic acids. If necessary, they may be neutralized or adjusted in pH with an alkali metal or an amine compound such as mentioned above.

The amount of the copolymerization monomer used for introducing an anionic group to a polyester resin is usually not more than 25 mol%, preferably 0.5 to 25 mol%, more preferably 1 to 20 mol%, still more preferably 2 to 15 mol% based on the whole polyvalent carboxylic acid or the whole polyvalent hydroxy compound. When the amount of the monomer is less than 0.5 mol%, water solubility or water dispersibility of the polyester resin tends to lower, and when the monomer amount exceeds 25 mol%, the formed coating layer may be adversely affected in water resistance or may absorb moisture to cause blocking of the produced film. An excess amount of the monomer also tends to deteriorate polymerizability of the polyester resin.

Two or more of these polyester resins may be used for forming the coating solution.

The "aqueous epoxy group-containing compound" used in the present invention is a coating compound containing water-soluble or water-dispersible epoxy groups, with water used as main coating medium. At least one, preferably two or more epoxy groups are contained in the molecule of this compound.

Examples of such epoxy group-containing compounds are glycidyl ethers of glycols, polyethers and polyols; glycidyl esters of carboxylic acids; and glycidyl-substituted amines. Among them, the glycidyl ethers are preferred. These glycidyl compounds can be easily obtained from reaction with epichlorohydrin, but of course other synthesizing methods can be employed as well. Typical examples of such glycidyl compounds include sorbitol polyglycidyl ether, sorbitan polyglycidyl ether, polyglycerol polyglycidyl ether, pentaerithritol polyglycidyl ether, diglycerol polyglycidyl ether, triglycidyl tris(2-hydroxyethyl)isocyanurate, glycerol polyglycidyl ether, trimethylolpropane polyglycidyl ether, resorcin diglycidyl ether, neopentyl glycol diglycidyl ether, 1,6-hexanediol diglycidylether, ethylene glycol diglycidyl ether, polyethylene glycol diglycidyl ether, propylene glycol, diglycidyl ether, polypropylene glycol diglycidyl ether, polytetramethylene glycol diglycidyl ether, adipic acid diglycidyl ether, orthophthalic acid diglycidyl ether, hydroquinone diglycidylether, bisphenol S diglycidyl ether, terephthalic acid glycidyl ether, and dibromoneopentyl glycol diglycidyl ether. There are also available commercial products of epoxy emulsions, such as those sold under the trade names of Denacol EM-125, Denacol EX-1101, Denacol X-1102 and Denacol EX-1103 (produced by Nagase Kasei Kogyo K.K.).

Two or more of these epoxy group-containing compounds may be contained in the coating solution. It is ordinary that plural compounds are mixed in the course of the synthesis.

In the present invention, it is essential that a coating layer is provided on a polyester film by using a coating solution containing an aqueous polyester and an aqueous epoxy group-containing compound(s) such as mentioned above, in a specific dry weight ratio which satisfies the following formula:

30/70≦
(aqueous polyester/aqueous epoxy group-containing compound)
≦90/10

When the dry weight ratio of aqueous polyester/aqueous epoxy group-containing compound is less than 30/70, the formed coating layer may have unsatisfactory adhesion properties to the support polyester film and unsatisfactory water resistance, and further the produced film may be found poor in anti-block properties. On the other hand, when the said dry weight ratio is more than 90/10, adhesion between the formed coating layer and the top coating photosensitive layer may be unsatisfactory.

The dry weight ratio of the aqueous polyester, the aqueous epoxy group-containing compound is preferably 50/50 to 70/30.

The present invention is thus featured by using a coating solution containing the specific compounds in a specific ratio, but in the present invention, other compound(s) may be blended in an amount not exceeding 40 wt % (in dry weight) based on the total weight of the aqueous polyester and the aqueous epoxy group-containing compound(s) as far as such blending of the other compound(s) do not affect the essential features of the present invention. For instance, there may be contained inorganic or organic fine particles for improving anti-block or slip properties, wax, antistatic agent, surfactant, defoamer, coating properties improver, thickener, antioxidant, ultraviolet absorber, foaming agent, dye, pigment and the like.

The film before coating may be subjected to a chemical treatment or a discharge treatment for improving application properties or adhesion of the coating solution to the film. Also, a discharge treatment may be conducted on the film after coating for the purpose of improving coating properties or adhesion between the polyester film and the photosensitive layer.

In the present invention, the coating layer may be provided on either one side or both sides of the polyester film, but usually a photosensitive layer is provided on one side of the support and a back coat such as antistatic layer or anti-curl layer is provided on the opposite side. Therefore, in the polyester film of the present invention designed to serve as a photographic support, an easy-to-adhere coating layer is preferably provided on both sides of the film.

On the photographic support produced according to the present invention, at least one photosensitive layer is provided to form a desired photographic material. For example, a silver halide emulsion layer may be provided. In such an emulsion, preferably gelatin is used as main binder. As silver halide emulsion, various kinds of conventional silver halide emulsions can be used optionally. The emulsion can be chemically sensitized by known methods, and it can also be optically sensitized to a desired range of wavelength by using a sensitizing pigment. Further, an anti-blushing agent, stabilizer, film hardener and the like can be added to the silver halide emulsion. As film hardener, there can be used various types of hardener, such as aldehyde type, aziridine type, isoxazole type, epoxy type, vinylsulfone type, acryloyl type, carbodiimide type, triazine type, high polymeric type, maleimide type, acetylene type, methanesulfonic acid ester type and the like, and these hardeners can be used either singly or in combination. It is also possible to contain a plasticizer, water-insoluble or slightly water-soluble synthetic polymer dispersion (latex), coupler, coating assistant, antistatic agent, formalin scarvenger, fluorescent whitener, matting agent, lubricant, image stabilizer, surfactant, discoloration inhibitor, development accelerator, development retarder, bleaching promoter and the like.

In the photographic material according to the present invention, there can be provided, beside the said silver halide emulsion layer, an auxiliary layer or layers such as protective layer, filter layer, backcoat, halation preventive layer, irradiation preventive layer, intermediate layer and the like. These photosensitive and other layers are properly selected according to the purpose of use of the photograph, and the layers that can be provided are not limited to those mentioned here.

As explained above, the present invention makes it possible to easily manufacture a polyester-based photographic support having a coating layer with high adhesion to the photosensitive layer, and thus its industrial value is very great.

EXAMPLES

The present invention is described in more detail with reference to the examples thereof, but it should be understood that these examples are merely intended to be illustrative and not to be construed as limiting the scope of the invention.

The evaluation methods used in the Examples are shown a below.

(1) Dry Weight of Coating

This was determined according to JIS K 5407-4.

(2) Intrinsic Viscosity of Polyester [η] (dl/g)

1 g of polyester was dissolved in 100 ml of a 50/50 (by weight) phenol/tetrachloroethane mixed solvent, and viscosity of this solution at 30° C. was measured.

(3) Adhesion Property 1 (Dry State) of Photosensitive Layer (Gelatin Layer)

A gelatin layer containing a hardener, a latex, a mattening agent and a yellow dye (added for facilitating understanding of the evaluation results) was provided on a base polyester film so as to adjust the thickness (after drying) to 3 μm, and this layer was sufficiently hardened and then subjected to moisture conditioning at 23° C. and 50% RH. Under this atmosphere, the layer was crosscut to form 100 squares at intervals of 1 mm from the surface of the gelatin layer, and then Polyester Adhesive Tape No. 31 mfd. by Nitto Denko K.K. was pasted thereon with care so that no air cells will be allowed to sneak in between the gelatin layer and the adhesive tape. A 2 kg metal roll was placed on the tape and moved to and fro 20 times repeatedly. Thereafter, the base polyester film side was bent 180° and a peel test was conducted by connecting one end of the polyester film to a 1 kg weight and making arrangement so that peel in the 180° direction will start after the weight has dropped gravitationally through a distance of 45 cm. The situation was visually observed and evaluation was made according to the following criterion.

| Evaluation | Situation |
|---|---|
| ⊚ (excellent): | No peeling occurred. |
| ○ (medial): | Less than 30% peeling took place. |
| Δ (rather bad): | 30% to not greater than 80% peeling took place. |
| X (bad): | 80% or more peeling took place. |

It is preferable that the film shows an evaluation result of ○ or better, more preferably ⊚.

(4) Adhesion Properties 2 [Wet State] of Photosensitive Layer (Gelatin Layer)

In the same manner as described in (3) above, there was provided a gelatin layer, followed by moisture conditioning and crosscutting. The layer surface was rubbed with a piece of felt which had been immersed in water and then wrung sufficiently, the said piece of felt being moved to and fro 30 times repeatedly on the layer surface under a load of 500 g by using a rubbing tester mfd. by Taihei Rika K.K. The amount of the gelatin layer which remained after rubbing was visually observed and evaluation was made according to the following criterion.

| Evaluation | Situation |
|---|---|
| ⊙ (excellent): | The layer remained 100%. |
| ○ (medial): | The layer remained 70% or more. |
| Δ (rather bad): | The layer remained 20% to not greater than 70%. |
| X (bad): | The layer remained less than 20%. |

It is preferable that the film shows an evaluation result of ○ or better, more preferably ⊙.

A process for producing the polyester film used in the Examples is described below.

Production Example 1 of Polyester Film: Polyethylene Terephthalate Film

Polyethylene terephthalate having an intrinsic viscosity of 0.63, prepared by conventional polymerization, was melt-extruded from a slit die at 280° C. onto a rotating chilling drum of 40° C. and rapidly chilled and solidified while using electrostatic pinning technique to obtain an amorphous sheet. This amorphous sheet was stretched 3.5 times in the machine (longitudinal) direction at 85° C. and then further stretched 4.0 times in the transverse direction at 105° C., followed by a heat-treatment at 220° C. to obtain a 100 μm thick biaxially stretched polyethylene terephthalate film.

Production Example 2 of Polyester Film: Polyethylene Naphthalate Film

Polyethylene-2,6-naphthalate having an intrinsic viscosity of 0.63, obtained by conventional solid-phase polymerization, was melt-extruded from a slit die at 300° C. onto a rotating chilling drum of 40° C. and rapidly chilled and solidified while using electrostatic pinning technique to obtain an amorphous sheet. This sheet was stretched 4.0 times in the machine direction at 130° C. and then further stretched 4.0 times in the transverse direction at 135° C., followed by a heat-treatment at 240° C. to obtain a 100 μm thick biaxially stretched polyethylene naphthalate film.

A coating method for forming a coating layer on the polyester film is described below.

Coating Method

The coating solutions of the compositions shown in Table 1 were applied, by using a bar coater, on the film which had been stretched in the machine direction but not yet stretched in the transverse direction in the polyester film producing process, with the concentration of each coating solution and the coating thickness being adjusted to provide the thicknesses conforming to the respective examples. The coating layer thickness shown in Table 2 is the thickness after drying and transverse stretching, that is, the thickness of the coating layer on the finished film.

The components of the coating compositions used in the Examples are described below.

Aqueous Polyesters

There were used aqueous polyesters A1 to A5.

The resins were copolymerized by a conventional method and dispersed in water. Their compositions are as shown in Table 1. The unit is mol%.

TABLE 1

|  | A1 | A2 | A3 | A4 | A5 |
|---|---|---|---|---|---|
| <Polyvalent carboxylic acid moiety> | | | | | |
| Terephthalic acid | 90 | | 55 | 30 | 40 |
| Isophthalic acid | | 90 | 40 | 55 | 30 |
| Cyclohexanedicarboxylic acid | | | | | 20 |
| 5-sodiumsulfoisophthalic acid | 10 | 10 | 5 | 15 | 10 |
| <Polyvalent hydroxy moiety> | | | | | |
| Ethylene glycol | 80 | 90 | 70 | 35 | 70 |
| Diethylene glycol | 20 | 10 | 10 | 15 | 5 |
| Triethylene glycol | | | | | |
| 1,4-butanediol | | | 20 | | |
| Neopentyl glycol | | | | 45 | |
| Cyclohexanedimethanol | | | | | 25 |

Aqueous Epoxy Group-containing Compounds

There were used aqueous epoxy group-containing compounds B1 and B2.

The main component of these compounds is listed as follows.

B1: tetraglycerol tetraglycidyl ether
B2: sorbitol triglycidyl ether

Aqueous Acryl

A water dispersion C1 of a polyacrylic resin compound was used.

C1: copolymer of 45 mol% methyl metacrylate, 30 mol% n-butyl acrylate, 20 mol% styrene and 5 mol% acrylic acid Aqueous Polyurethane A water dispersion D1 of a polyurethane resin compound was used.

D1 : Hydran APX-101 (trade name, mfd. by Dainippon Ink and Chemicals Inc.), a water dispersion of a polyester-type polyurethane resin having a carboxylic base Melamine Compound A melamine compound E1 was used.

E1 : a water-soluble melamine compound substantially comprising mono-, di- and tri-nuclides of tetrafunctional methylol or methoxytrimethylol melamine

Examples 1 to 17

In the manner described above, the coating layers described in Table 2 were provided on the respective polyester films also described in Table 2. In Table 2, PET in the column of "Polyester film" designates polyethylene terephthalate film and PEN designates polyethylene-2,6-naphthalate film. Also, the numerical values indicating the ratios of the aqueous polyester and the aqueous epoxy group-containing compound in each coating layer are the ratio by weight (wt %) based on the dry weight of the corresponding coating composition, that on the finally produced film.

Comparative Examples 1 to 15

In the same way as described above, the coating layers described in Table 3 were provided on the respective polyester films also described in Table 3. In Table 3, PET in the column of "Polyester film" designates polyethylene terephthalate film and PEN designates polyethylene-2,6-naphthalate film. Also, the numerical values indicating the ratios of the aqueous polyester and the aqueous epoxy group-containing compound in each coating layer are the ratio by weight (wt %) based on the dry weight of the corresponding coating composition, and the thickness of the coating layer shown in Table 3 is that on the finally produced film.

Comparative Examples 15 and 16

These are the examples where no coating layer was provided as shown in Table 3.

TABLE 2

| Polyester film | | Coating layer | | | |
|---|---|---|---|---|---|
| | | Components | Ratio (wt %) | Components | Ratio (wt %) | Thickness |
| Example 1 | PET | A1 | 90 | B1 | 10 | 0.2 |
| Example 2 | PET | A1 | 80 | B2 | 20 | 0.2 |
| Example 3 | PET | A1 | 70 | B1 | 30 | 0.1 |
| Example 4 | PET | A1 | 70 | B2 | 30 | 0.1 |
| Example 5 | PET | A2 | 70 | B1 | 30 | 0.1 |
| Example 6 | PET | A1 | 60 | B1 | 40 | 0.05 |
| Example 7 | PET | A3 | 50 | B1 | 50 | 0.05 |
| Example 8 | PET | A4 | 50 | B1 | 50 | 0.1 |
| Example 9 | PET | A5 | 50 | B1 | 50 | 0.1 |
| Example 10 | PET | A1 | 30 | B1 | 70 | 0.1 |
| Example 11 | PET | A2 | 30 | B1 | 70 | 0.1 |
| Example 12 | PET | A1 | 70 | B1 | 30 | 0.1 |
| Example 13 | PET | A2 | 60 | B1 | 40 | 0.1 |
| Example 14 | PET | A1 | 50 | B2 | 50 | 0.1 |
| Example 15 | PET | A3 | 50 | B1 | 50 | 0.1 |
| Example 16 | PET | A4 | 50 | B1 | 50 | 0.1 |
| Example 17 | PET | A5 | 50 | B2 | 50 | 0.1 |

| Polyester film | | Adhesion evaluation results | |
|---|---|---|---|
| | | Dry | Wet |
| Example 1 | PET | ◎ | ○ |
| Example 2 | PET | ◎ | ◎ |
| Example 3 | PET | ◎ | ◎ |
| Example 4 | PET | ◎ | ◎ |
| Example 5 | PET | ◎ | ◎ |
| Example 6 | PET | ◎ | ◎ |
| Example 7 | PET | ◎ | ◎ |
| Example 8 | PET | ◎ | ◎ |
| Example 9 | PET | ◎ | ◎ |
| Example 10 | PET | ◎ | ○ |
| Example 11 | PET | ◎ | ○ |
| Example 12 | PET | ◎ | ◎ |
| Example 13 | PET | ◎ | ◎ |
| Example 14 | PET | ◎ | ◎ |
| Example 15 | PET | ◎ | ◎ |
| Example 16 | PET | ◎ | ◎ |
| Example 17 | PET | ◎ | ◎ |

TABLE 3

| Polyester film | | Coating layer | | | | |
|---|---|---|---|---|---|---|
| | | Components | Ratio (wt %) | Components | Ratio (wt %) | Thickness |
| Comp. Example 1 | PET | A1 | 95 | B1 | 5 | 0.2 |
| Comp. Example 2 | PET | A1 | 20 | B2 | 80 | 0.1 |
| Comp. Example 3 | PET | A1 | 10 | B1 | 90 | 0.2 |
| Comp. Example 4 | PET | A1 | 100 | | | 0.2 |
| Comp. Example 5 | PET | A2 | 100 | | | 0.2 |
| Comp. Example 6 | PET | A3 | 100 | | | 0.2 |
| Comp. Example 7 | PET | A4 | 100 | | | 0.2 |
| Comp. Example 8 | PET | A5 | 100 | | | 0.2 |
| Comp. Example 9 | PEN | A1 | 100 | | | 0.2 |
| Comp. Example 10 | PEN | A2 | 100 | | | 0.2 |
| Comp. Example 11 | PET | C1 | 60 | B1 | 40 | 0.1 |
| Comp. Example 12 | PET | D1 | 60 | B1 | 40 | 0.1 |
| Comp. Example 13 | PET | C1 | 100 | | | 0.1 |
| Comp. Example 14 | PET | D1 | 100 | | | 0.1 |
| Comp. Example 15 | PET | A1 | 80 | E1 | 20 | 0.2 |
| Comp. Example 16 | PET | — | — | — | — | — |
| Comp. Example 17 | PEN | — | — | — | — | — |

| Polyester film | | Adhesion evaluation results | |
|---|---|---|---|
| | | Dry | Wet |
| Comp. Example 1 | PET | ○ | Δ |
| Comp. Example 2 | PET | ○ | Δ |
| Comp. Example 3 | PET | Δ | X |
| Comp. Example 4 | PET | Δ | X |
| Comp. Example 5 | PET | Δ | X |
| Comp. Example 6 | PET | Δ | X |
| Comp. Example 7 | PET | Δ | X |
| Comp. Example 8 | PET | Δ | X |
| Comp. Example 9 | PEN | Δ | X |
| Comp. Example 10 | PEN | Δ | X |
| Comp. Example 11 | PET | X | X |
| Comp. Example 12 | PET | ○ | Δ |
| Comp. Example 13 | PET | X | X |
| Comp. Example 14 | PET | Δ | X |
| Comp. Example 15 | PET | Δ | X |
| Comp. Example 16 | PET | X | X |
| Comp. Example 17 | PEN | X | X |

What is claimed is:

1. A polyester-based photographic support comprising:
    a polyester film, and
    a coating layer formed thereon by applying a coating solution consisting essentially of an aqueous polyester and an aqueous epoxy group-containing compound so as to be a dry weight of aqueous polyester to aqueous epoxy group-containing compound of 30:70 to 90:10, on at least one side of said polyester film.

2. A polyester-based photographic support according to claim 1, wherein the polyester film comprises polyethylene terephthalate.

3. A polyester-based photographic support according to claim 1, wherein the polyester film comprises polyethylene-2,6-naphthalate.

4. A polyester-based photographic support according to claim 1, wherein the aqueous polyester is synthesized by a polycondensation reaction of a polyvalent carboxylic acid and a polyvalent hydroxy compound, said polyvalent carboxylic acid is selected from the group consisting of terephthalic acid, isophthalic acid, 2,6-naphthalenedicarboxylic acid, 1,4-cyclohexanedicarboxylic acid and their ester-forming derivatives, and said polyvalent hydroxy compound is selected from the group consisting of ethylene glycol, diethylene glycol, triethylene glycol, neopentyl glycol and 1,4-cyclohexanedimethanol.

5. A polyester-based photographic support according to claim 1, wherein the aqueous polyester has an anionic group in the molecule.

6. A polyester-based photographic support according to claim 5, wherein the anionic group is at least one selected from the group consisting of sulfonic group, carboxyl group, phosphoric acid group, and their lithium bases, sodium bases, potassium bases and ammonium bases.

7. A polyester-based photographic support according to claim 1, wherein the aqueous epoxy group-containing compound is at least one selected from the group consisting of glycidyl ethers of glycols, polyethers and polyols; glycidyl esters of carboxylic acids; and glycidyl-substituted amines.

8. A polyester-based photographic support according to claim 1, wherein the dry weight ratio of the aqueous polyester to the aqueous epoxy group-containing compound is 50/50 to 70/30.

9. A polyester-based photographic support comprising:
   a polyester film, and
   a coating layer formed thereon by applying a coating solution consisting essentially of an aqueous polyester and an aqueous epoxy group-containing compound so as to be a dry weight of aqueous polyester to aqueous epoxy group-containing compound of 30:70 to 90:10, on at least one side of said polyester film, wherein the thickness of the polyester-based photographic support is 50 to 350 $\mu$m.

10. A polyester-based photographic support according to claim 1, wherein the thickness of the coating layer after dried is 0.001 to 10 $\mu$m.

11. A process for producing a polyester-based photographic support, which comprises applying a coating solution consisting essentially of an aqueous polyester and an aqueous epoxy group-containing compound so as to be a dry weight of aqueous polyester to aqueous epoxy group-containing compound of 30:70 to 90:10, on at least one side of a polyester film, and drying the coat.

12. The process according to claim 11, wherein the polyester film comprises polyethylene terephthalate.

13. The process according to claim 11, wherein the polyester film comprises polyethylene-2,6-naphthalate.

14. The process according to claim 11, wherein the applying the coating solution is conducted in the producing operation of polyester film.

15. The process according to claim 11, wherein the applying the coating solution is made on both sides of the polyester film.

16. A polyester-based photographic support comprising:
   a polyester film, and
   a coating layer formed thereon by applying a coating solution consisting essentially of an aqueous polyester and an aqueous epoxy group-containing compound so as to be a dry weight of aqueous polyester to aqueous epoxy group-containing compound of 30:70 to 90:10, on at least one side of said polyester film, wherein the photographic support further comprises at least one photosensitive layer provided on said support.

17. A photographic material according to claim 16, wherein the photosensitive layer is a layer of a silver halide photographic emulsion.

* * * * *